US011948712B2

(12) United States Patent
Sano

(10) Patent No.: US 11,948,712 B2
(45) Date of Patent: Apr. 2, 2024

(54) MAGNETIC POWDER, MAGNETIC POWDER MOLDED BODY, AND METHOD FOR MANUFACTURING MAGNETIC POWDER

(71) Applicant: Seiko Epson Corporation, Toyko (JP)

(72) Inventor: Toshiki Sano, Hachinohe (JP)

(73) Assignee: SEIKO EPSON CORPORATION (JP)

( * ) Notice: Subject to any disclaimer, the term of this patent is extended or adjusted under 35 U.S.C. 154(b) by 79 days.

(21) Appl. No.: 17/194,865

(22) Filed: Mar. 8, 2021

(65) Prior Publication Data

US 2021/0276093 A1 Sep. 9, 2021

(30) Foreign Application Priority Data

Mar. 9, 2020 (JP) ................................ 2020-039606

(51) Int. Cl.

| | |
|---|---|
| ***H01F 1/20*** | (2006.01) |
| ***B22F 1/05*** | (2022.01) |
| ***B22F 1/14*** | (2022.01) |
| ***B22F 1/142*** | (2022.01) |
| ***B22F 9/00*** | (2006.01) |
| ***B22F 9/08*** | (2006.01) |
| ***C22C 38/02*** | (2006.01) |

(Continued)

(52) U.S. Cl.

CPC ............ *H01F 1/15308* (2013.01); *B22F 1/05* (2022.01); *B22F 1/14* (2022.01); *B22F 1/142* (2022.01); *B22F 9/007* (2013.01); *B22F 9/082* (2013.01); *C22C 38/02* (2013.01); *C22C 38/12* (2013.01); *C22C 38/20* (2013.01); *H01F 1/153* (2013.01); *H01F 1/20* (2013.01); *B22F 2304/10* (2013.01); *C22C 2200/04* (2013.01)

(58) Field of Classification Search

CPC .. H01F 1/14766; H01F 1/153; H01F 1/15325; H01F 1/15333; H01F 1/1535; H01F 1/20; C22C 38/02; C22C 38/12; C22C 38/16; B22F 9/002; B22F 9/007; B22F 9/082; B22F 2009/0824; B22F 2009/0828

See application file for complete search history.

(56) References Cited

U.S. PATENT DOCUMENTS

2005/0034787 A1* 2/2005 Song ....................... B22F 9/007 148/104
2017/0148554 A1* 5/2017 Kudo ....................... H01F 27/24

(Continued)

FOREIGN PATENT DOCUMENTS

CN 107039137 A 8/2017
JP S62-029108 A 2/1987

(Continued)

*Primary Examiner* — Alexandra M Moore

(74) *Attorney, Agent, or Firm* — Harness, Dickey & Pierce, P.L.C.

(57) ABSTRACT

A magnetic powder contains a soft magnetic material represented by the following composition formula, in which an average particle size is 2 μm or more and 10 μm or less, and at least a surface layer is nanocrystallized, $$Fe_aCu_bNb_cSi_dB_e$$

where, a, b, c, d, and e each indicate atomic percentage, 71.0 at %≤a≤76.0 at %, 0.5 at %≤b≤1.5 at %, 2.0 at %≤c≤4.0 at %, 11.0 at %≤d≤16.0 at %, and 8.0 at %≤e≤13.0 at %.

3 Claims, 4 Drawing Sheets

(51) Int. Cl.

| | |
|---|---|
| ***C22C 38/12*** | (2006.01) |
| ***C22C 38/20*** | (2006.01) |
| ***H01F 1/153*** | (2006.01) |

(56) References Cited

U.S. PATENT DOCUMENTS

| | | | | |
|---|---|---|---|---|
| 2019/0043646 | A1 | 2/2019 | Yoshidome et al. | |
| 2019/0279797 | A1 * | 9/2019 | Nakano | H01F 1/15308 |
| 2020/0238374 | A1 * | 7/2020 | Chiba | H01F 17/04 |
| 2020/0243238 | A1 * | 7/2020 | Kato | B22F 9/08 |

FOREIGN PATENT DOCUMENTS

| | | | | | |
|---|---|---|---|---|---|
| JP | H05-335154 | A | | 12/1993 | |
| JP | 2003-303712 | A | | 10/2003 | |
| JP | 2005-171275 | A | | 6/2005 | |
| JP | 2007-134591 | A | | 5/2007 | |
| JP | 2016025352 | A | * | 2/2016 | B22F 1/0018 |
| JP | 2019-148004 | A | | 9/2019 | |
| JP | 2020-056107 | A | | 4/2020 | |
| WO | WO-2019031464 | A1 | * | 2/2019 | B22F 1/00 |
| WO | 2019/189614 | A1 | | 10/2019 | |

* cited by examiner

MAGNETIC POWDER, MAGNETIC POWDER MOLDED BODY, AND METHOD FOR MANUFACTURING MAGNETIC POWDER

The present application is based on, and claims priority from JP Application Serial Number 2020-039606, filed Mar. 9, 2020, the disclosure of which is hereby incorporated by reference herein in its entirety.

BACKGROUND

1. Technical Field

The present disclosure relates to a magnetic powder, a magnetic powder molded body, and a method for manufacturing a magnetic powder.

2. Related Art

In the related art, a magnetic powder used for a magnetic core of an inductor, or the like is known. For example, JP-A-2007-134591 proposes a composite magnetic material obtained by mixing a material having a nanocrystal structure and a material having an amorphous structure, which is intended to reduce iron loss or the like in a high-frequency band.

However, the composite magnetic material described in JP-A-2007-134591 has a problem that it is difficult to further improve magnetic properties. Specifically, a demand for a member containing a magnetic material such as a magnetic core increases more than ever, which has a higher magnetic flux density, or a lower loss or a higher magnetic permeability of a magnetic sheet corresponding to a large current of a smartphone inductor or miniaturization of a substrate, and miniaturization or weight reduction of an in-vehicle reactor. That is, the magnetic material is required to have magnetic properties higher than that in the related art.

SUMMARY

A magnetic powder contains a soft magnetic material represented by the following composition formula, in which an average particle size is 2 μm or more and 10 μm or less, and at least a surface layer is nanocrystallized, $Fe_aCu_bNb_cSi_dB_e$ where a, b, c, d, and e each indicates an atomic percentage, 71.0 at %≤a≤76.0 at %, 0.5 at %≤b≤1.5 at %, 2.0 at %≤c≤4.0 at %, 11.0 at %≤d≤16.0 at %, and 8.0 at %≤e≤13.0 at %.

A magnetic powder molded body contains the above magnetic powder.

A method for manufacturing a magnetic powder includes: a powdering step of making a molten metal containing a soft magnetic material represented by the following composition formula into a raw material powder by a water atomizing method; a classification step of classifying the raw material powder into a powder having an average particle size of 2 μm or more and 10 μm or less; and a heat treatment step of heating the powder and nanocrystallizing at least a surface layer of the powder into a magnetic powder, $Fe_aCu_bNb_cSi_dB_e$ where a, b, c, d, and e each indicates an atomic percentage, 71.0 at %≤a≤76.0 at %, 0.5 at %≤b≤1.5 at %, 2.0 at %≤c≤4.0 at %, 11.0 at %≤d≤16.0 at %, and 8.0 at %≤e≤13.0 at %.

DESCRIPTION OF EXEMPLARY EMBODIMENTS

1. Embodiments 1.1. Magnetic Powder

Figure 1:
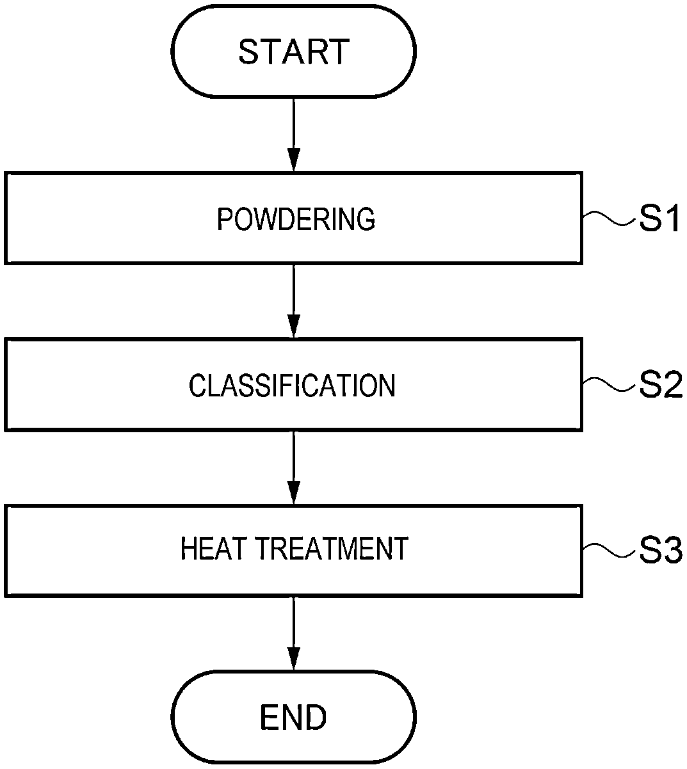
FIG. 1 is a process flow chart showing a method for manufacturing a magnetic powder according to an embodiment.

A configuration of a magnetic powder according to an embodiment will be described. The magnetic powder of the present embodiment contains a soft magnetic material represented by the following composition formula (1), $$Fe_aCu_bNb_cSi_dB_e \quad (1)$$

where a, b, c, d, and e each indicates an atomic percentage, 71.0 at %≤a≤76.0 at %, 0.5 at %≤b≤1.5 at %, 2.0 at %≤c≤4.0 at %, 11.0 at %≤d≤16.0 at %, and 8.0 at %≤e≤13.0 at %.

The soft magnetic material represented by the composition formula (1) originally belongs to a Fe—Cu—Nb—Si—B-based alloy, which has a lower loss and a higher magnetic permeability than other soft magnetic materials. Hereinafter, the soft magnetic material represented by the composition formula (1) is also simply referred to as the soft magnetic material of the composition formula (1).

The soft magnetic material of the composition formula (1) is preferably $Fe_{73.5}Cu_{1.0}Nb_{3.0}Si_{13.5}B_{9.0}$. Accordingly, when the soft magnetic material is made into a magnetic powder molded body, the loss can be further reduced and the magnetic permeability can be further improved.

At least a surface layer of a particle of the magnetic powder is nanocrystallized. Regarding a crystal state of the particle of the magnetic powder, it is preferable that both the surface layer and the inside of the particle are nanocrystallized. Accordingly, an increase in a magnetic core loss in a high-frequency band is prevented when the soft magnetic material is made into a magnetic powder molded body as compared with a case where the crystal state of the particle is amorphous.

The soft magnetic material is preferably contained in an amount of 80 wt % or more, more preferably 90 wt % or more, and still more preferably 100 wt %, based on a total mass of the magnetic powder. Accordingly, a soft magnetism of the magnetic powder is improved.

The magnetic powder may contain impurities or additives in addition to the soft magnetic material. Examples of the additives include various metal materials, various non-metal materials, and various metal oxide materials.

An average particle size of the magnetic powder is 2 μm or more and 10 μm or less, and more preferably 2 μm or more and 5 μm or less. Accordingly, the increase in the magnetic core loss in the high-frequency band is prevented when the magnetic powder is made into a magnetic powder molded body as compared with a case where the average particle size is more than 10 μm. Here, the average particle size in the present specification refers to a volume-based particle size distribution (50%). The average particle size is measured by a dynamic light scattering method or a laser diffracted light method described in JIS Z8825. Specifically, for example, a particle size distribution meter using the dynamic light scattering method as a measurement principle can be adopted.

1.2. Method for Manufacturing Magnetic Powder

A method for manufacturing a magnetic powder according to the present embodiment will be described with reference to FIG. 1.

As shown in FIG. 1, the method for manufacturing a magnetic powder of the present embodiment includes step S1 to step S3. A process flow shown in FIG. 1 is an example and the present disclosure is not limited thereto.

Step S1 is a powdering step, in which a molten metal containing the soft magnetic material represented by the above composition formula (1) is made into a raw material powder by a water atomizing method. Accordingly, the molten metal is rapidly cooled by water as a spray medium as compared with a method other than the water atomizing method, such as a gas atomizing method. Therefore, the soft magnetic material of the composition formula (1) is once amorphized. Then, the soft magnetic material is nanocrystallized in a heat treatment step which is step S3 described later. That is, it is easier to precipitate nanocrystals as compared with a case of nanocrystallizing the soft magnetic material from a crystallized state.

A device used for the water atomizing method of the present embodiment is not particularly limited, and a known device can be adopted. Then, the process proceeds to step S2.

Step S2 is a classification step, in which the raw material powder obtained in step S1 is classified into a powder having an average particle size of 2 μm or more and 10 μm or less. Examples of a method for classifying the raw material powder include dry classification and wet classification using gravity, a centrifugal force, an inertial force, or the like, and sieving classification. Of these, it is preferable to use wind power classification as the dry classification.

According to the wind power classification, the average particle size can be easily classified to 10 μm or less as compared with other classification methods. Specifically, in the wet classification, since the raw material powder is not brought into contact with a liquid medium, a step of separating the powder obtained by the classification and the liquid medium can be omitted. In the sieving classification, it is possible to avoid an occurrence of an obstacle such as clogging of a sieve. For the wind power classification, for example, a known device such as a centrifugal classifier can be adopted. Then, the process proceeds to step S3.

Step S3 is the heat treatment step, in which the powder obtained in step S2 is heated and at least the surface layer of the particle in the powder is nanocrystallized into the magnetic powder. Here, regarding the crystal state of the particle of the magnetic powder, it is preferable that both the surface layer and the inside of the particle are nanocrystallized.

A heating temperature for the powder in step S3 is preferably equal to or higher than a phase transition temperature of the soft magnetic material, and more preferably 550° C. or higher and 600° C. or lower. By setting the heating temperature to be equal to or higher than the phase transition temperature of the soft magnetic material, nanocrystallization of the soft magnetic material can be promoted. Therefore, the nanocrystallization can further improve high frequency characteristics.

Further, by setting the heating temperature to 550° C. or higher and 600° C. or lower, among the soft magnetic material of the composition formula (1), in particular, when $Fe_{73.5}Cu_{1.0}Nb_{3.0}Si_{13.5}B_{9.0}$ having a phase transition temperature of around 540° C. is used, the nanocrystallization can be further promoted.

Here, the phase transition temperature of the soft magnetic material is measured by, for example, a differential scanning calorimetry (DSC). Specifically, the powder before the heat treatment is used as a sample, and the temperature is raised from about 25° C. to 700° C. or higher at a heating rate of 10° C. per minute under a nitrogen gas atmosphere using a known differential scanning calorimeter. In a DSC chart obtained by this measurement, a peak temperature of a first exothermic peak corresponds to the phase transition temperature.

A heating time of the heat treatment in step S3, that is, a time for heating the soft magnetic material to a temperature equal to or higher than the phase transition temperature is not particularly limited as long as the nanocrystallization is achieved, and is, for example, 5 minutes or longer and 60 minutes or shorter.

An atmosphere during the heat treatment is not particularly limited, and examples of the atmosphere include an oxidizing gas atmosphere including oxygen gas, air, or the like, a reducing gas atmosphere including hydrogen gas, ammonia decomposition gas, or the like, an inert gas atmosphere including nitrogen gas, argon gas, or the like, and a decompression atmosphere with optional decompressed gas, or the like. Of these atmospheres, the reducing gas atmosphere or the inert gas atmosphere is preferred, and the decompression atmosphere is more preferred. Accordingly, an increase in a thickness of an oxide film of the magnetic powder particle is prevented.

A device used for the heat treatment is not particularly limited as long as the above treatment conditions can be set, and a known electric furnace or the like can be adopted.

A volume resistivity of the magnetic powder when filled in a container, that is, a specific resistance is preferably 1 MΩ·cm or more, more preferably 5 MΩ·cm or more and 1000 GΩ·cm or less, and still more preferably 10 MΩ or more and 500 GΩ·cm or less.

When the specific resistance is within the above range, an insulating property between the particles in the magnetic powder is ensured, and an amount of an additional insulating material used in manufacturing the magnetic powder molded body is reduced. Therefore, a content of the magnetic powder can be increased to achieve both the magnetic properties and the lower loss. Further, a dielectric breakdown voltage can be increased. The specific resistance of the magnetic powder can be measured by the following procedures.

An alumina cylinder is filled with 1 g of the magnetic powder, and brass electrodes are placed at both ends of the cylinder. Then, while pressurizing between the electrodes at both the ends of the cylinder with a load of 20 kgf using a digital force gauge, an electrical resistance between the electrodes at both the ends of the cylinder is measured using a digital multimeter. At this time, a distance between the electrodes at both the ends of the cylinder is also measured.

Next, the measured distance and electrical resistance between the electrodes during pressurization and a cross-sectional area inside the cylinder are substituted into the following formula (2) to calculate the specific resistance.

$$\text{Specific resistance } [\mathrm{M\Omega \cdot cm}] = \text{electrical resistance } [\mathrm{M\Omega}] \times \text{cross-sectional area inside cylinder } [\mathrm{cm^2}] / \text{distance between electrodes during pressurization } [\mathrm{cm}] \quad (2)$$

The cross-sectional area inside the cylinder is equal to $\pi r^2$ [$cm^2$] when an inner diameter of the cylinder is 2r [cm]. The inner diameter of the cylinder is not particularly limited, and is, for example, 0.8 cm. The distance between the electrodes during the pressurization is not particularly limited, and is, for example, 0.425 cm.

The magnetic powder is manufactured through the above steps.

1.3. Magnetic Powder Molded Body

The magnetic powder of the present embodiment is preferably used for an antenna, a magnetic sheet, or the like, as well as a dust core provided in coil components such as an inductor or a toroidal coil. Therefore, the magnetic powder is formed into a desired shape according to these uses. Hereinafter, the dust core will be illustrated as the magnetic powder molded body containing the magnetic powder of the present embodiment.

The coil components to which the dust core as the magnetic powder molded body according to the present embodiment is applied will be described with reference to FIGS. 2 and 3. In the present embodiment, the toroidal coil and the inductor are illustrated as the coil components.

Figure 2:
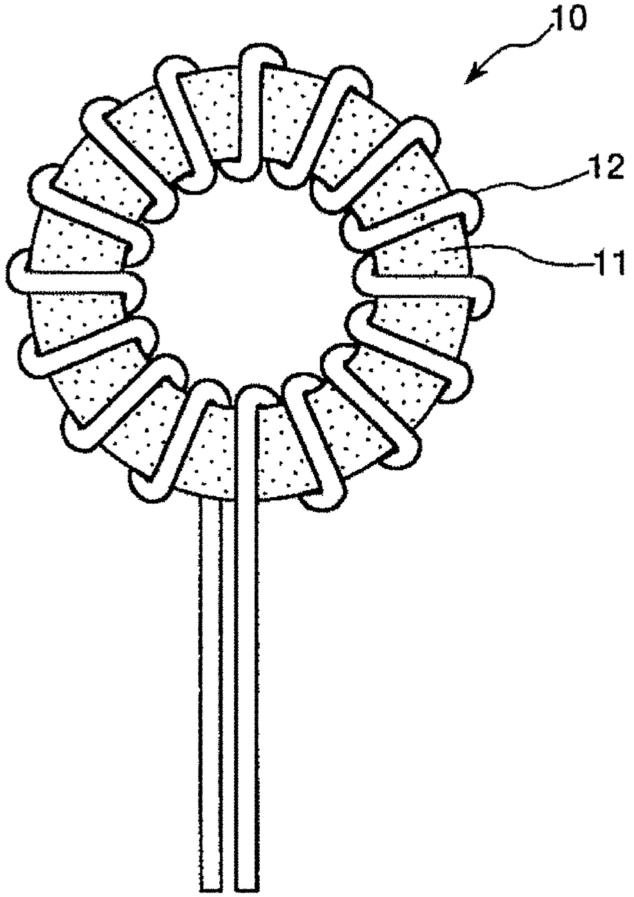
FIG. 2 is an external view of a toroidal coil to which a dust core as a magnetic powder molded body is applied.

As shown in FIG. 2, a toroidal coil 10 includes a ring-shaped dust core 11 and a conducting wire 12 wound around the dust core 11. The dust core 11 is formed by molding the magnetic powder of the present embodiment into a ring shape.

The dust core 11 is manufactured by mixing the magnetic powder and a binder to form a mixture, and press-molding the mixture, and performing so-called compaction. Examples of the binder include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate.

The binder is not an indispensable composition, and the dust core 11 may be manufactured without using the binder. The mixture may contain a solvent such as an organic solvent. In this case, the mixture may be dried once to prepare a lump, and then the lump may be crushed and then press-molded.

A material for forming the conducting wire 12 is not particularly limited as long as the material has a high conductivity, and examples of the material include metal materials containing copper (Cu), aluminum (Al), silver (Ag), gold (Au), and nickel (Ni).

Although not shown, a surface layer having an insulating property is provided on a surface of the conducting wire 12. The surface layer prevents an occurrence of a short circuit between the dust core 11 and the conducting wire 12. A known resin having an insulating property can be adopted as a material for forming the surface layer.

A shape of the dust core 11 is not limited to the ring shape, and may be, for example, a shape in which a part of a ring misses, a rod shape, or the like.

The dust core 11 may contain a powder having magnetism other than the magnetic powder of the present embodiment, or a non-magnetic powder, if necessary. When these types of powders are contained, a mixing ratio of these types of powders and the magnetic powder is not particularly limited and is optionally set. Further, a plurality of types of the above powders other than the magnetic powder may be used.

In the present embodiment, the toroidal coil 10 is illustrated as the coil component, but the present disclosure is not limited thereto. In addition to the toroidal coil, examples of the coil component to which the magnetic powder molded body is applied include an inductor, a reactor, a transformer, a motor, and a generator. Further, the magnetic powder molded body may be applied to a component other than the coil component such as an antenna and a magnetic sheet.

Figure 3:
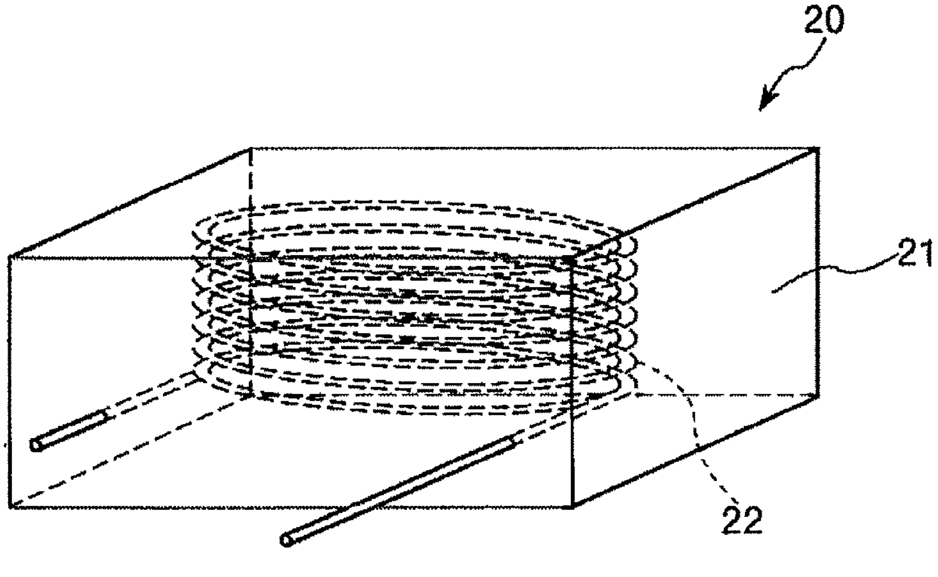
FIG. 3 is a transmission perspective view of an inductor to which the dust core as the magnetic powder molded body is applied.

As shown in FIG. 3, an inductor 20 includes a dust core 21 obtained by molding the magnetic powder of the present embodiment into a substantially rectangular parallelepiped shape. In the inductor 20, a conducting wire 22 that is formed into a coil shape is embedded inside the dust core 21. That is, the inductor 20 is formed by molding the conducting wire 22 by the dust core 21.

Since the conducting wire 22 is embedded inside the dust core 21, a gap is unlikely to occur between the conducting wire 22 and the dust core 21. Therefore, a vibration due to a magnetostriction of the dust core 21 can be prevented, and a generation of noise due to the vibration can be prevented. Further, since the conducting wire 22 is formed by being embedded in the dust core 21, the inductor 20 can be easily miniaturized.

The dust core 21 has a configuration the same as the dust core 11 except that the shape is different. The conducting wire 22 has a configuration the same as the conducting wire 12 described above, except that the formed shape is different.

According to the present embodiment, the following effects can be obtained.

In the magnetic powder, the magnetic properties can be improved as compared with that in the related art. Specifically, the magnetic powder originally contains the soft magnetic material of the composition formula (1) having a lower loss and a higher magnetic permeability. In addition, since the average particle size is a small particle size within a predetermined range and the particle is nanocrystalline, as compared with a case where the average particle size is large and the particle is amorphous, the increase in the magnetic core loss in the high-frequency band is prevented. Therefore, it is possible to provide a magnetic powder having improved magnetic properties such as high frequency characteristics and magnetic permeability as compared with that in the related art.

It is possible to manufacture the magnetic powder having improved magnetic properties as compared with that in the related art. Specifically, since the magnetic powder contains the soft magnetic material of the composition formula (1), the magnetic powder has a lower loss and a higher magnetic permeability. Further, the high frequency characteristics are improved by the classification in the classification step and the nanocrystallization in the heat treatment step. Therefore, it is possible to provide the method for manufacturing magnetic powder having improved magnetic properties such as the high frequency characteristics and the magnetic permeability as compared with that in the related art.

It is possible to provide the dust cores 11 and 21 having improved magnetic properties such as the loss, the magnetic permeability and the high frequency characteristics as compared with that in the related art.

2. Examples and Comparative Examples

Hereinafter, the effects of the present disclosure will be described in more detail with reference to Examples and Comparative Examples. The present disclosure is not limited to the following Examples.

2.1. Manufacturing of Magnetic Powder

First, magnetic powders of Examples 1 to 3 and Comparative Examples 1 to 6 were manufactured by procedures described below.

For the magnetic powder of Example 1, $Fe_{73.5}Cu_{1.0}Nb_{3.0}Si_{13.5}B_{9.0}$, as the soft magnetic material of the composition formula (1), was used among Fe—Cu—Nb—Si—B-based alloys, and was powdered by a water atomizing method to obtain a raw material powder. Next, the raw material powder was classified by wind power classification to have an average particle size of 5.0 μm, so as to obtain a powder before a heat treatment. At this time, in order to observe the crystal state described later, a part of the powder was set aside and used as a sample of the powder before the heat treatment in Example 1. The remaining powder was subjected to a heat treatment at 550° C. for 15 minutes and used as a sample of the magnetic powder in Example 1.

The magnetic powder of Example 2 was manufactured in the same manner as the magnetic powder of Example 1 except that the raw material powder was classified to have an average particle size of 3.3 μm.

The magnetic powder of Example 3 was manufactured in the same manner as the magnetic powder of Example 1 except that the raw material powder was classified to have an average particle size of 7.8 μm.

The magnetic powder of Comparative Example 1 was manufactured in the same manner as the magnetic powder of Example 1 except that the raw material powder was classified to have an average particle size of 24.9 μm. The magnetic powder of Comparative Example 1 had an average particle size of more than 10 μm.

The magnetic powder of Comparative Example 2 was manufactured in the same manner as the magnetic powder of Example 1 except that a high-speed rotating water flow atomizing method was adopted as a method for producing the raw material powder and the powder was classified to have an average particle size of 3.0 μm.

The magnetic powder of Comparative Example 3 was manufactured in the same manner as the magnetic powder of Comparative Example 2 except that the raw material powder was classified to have an average particle size of 16.0 μm. The magnetic powder of Comparative Example 3 had an average particle size of more than 10 μm and the water atomizing method was not used in the powdering step.

The magnetic powder of Comparative Example 4 was manufactured in the same manner as the magnetic powder of Comparative Example 2 except that the raw material powder was classified to have an average particle size of 24.0 μm. The magnetic powder of Comparative Example 4 had an average particle size of more than 10 μm and the water atomizing method was not used in the powdering step.

The magnetic powder of Comparative Example 5 was manufactured in the same manner as the magnetic powder of Example 1 except that $(Fe_{0.97}Cr_{0.33})_{76}(Si_{0.5}B_{0.5})_{22}C_2$ was adopted as the soft magnetic material, and the raw material powder was classified to haven an average particle size of 3.1 μm. The magnetic powder of Comparative Example 5 did not contain the soft magnetic material of the composition formula (1).

The magnetic powder of Comparative Example 6 was manufactured in the same manner as the magnetic powder of Comparative Example 5 except that the high-speed rotating water flow atomizing method was adopted as the method for producing the raw material powder and the powder was classified to have an average particle size of 24.0 μm. The magnetic powder of Comparative Example 6 did not contain the soft magnetic material of the composition formula (1), and had an average particle size of more than 10 μm, and the water atomizing method was not used in the powdering step.

2.2. Observation of Crystal State of Magnetic Powder

Regarding Example 1, internal crystal states of the powder before the heat treatment in the heat treatment step and the magnetic powder after the heat treatment were observed. Specifically, for one particle of the sample, a cross-section thin sample inside the particle was produced and observed with a transmission electron microscope. Electron micrographs are shown in FIGS. 4 and 5.

Figure 4:
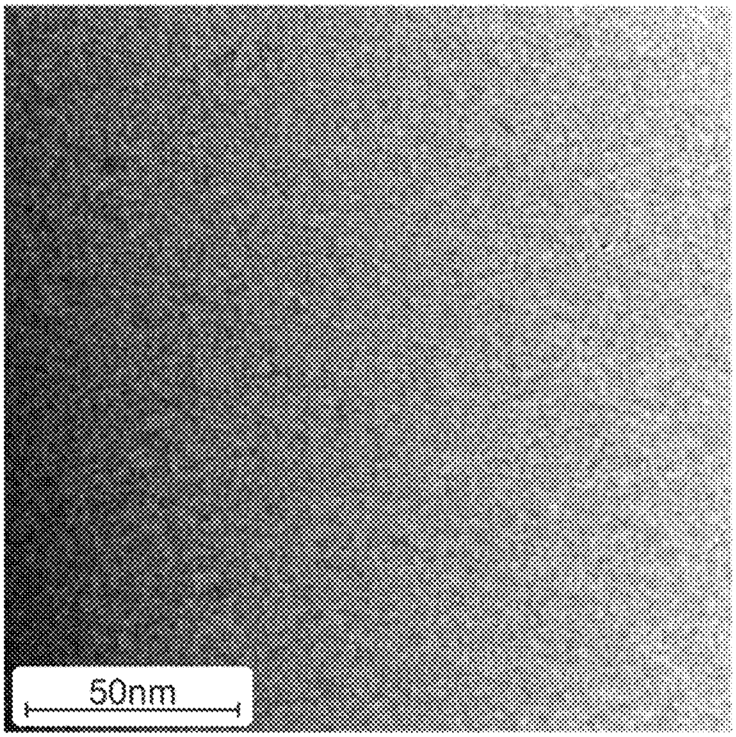
FIG. 4 is an electron micrograph showing a crystal state of one particle of a powder before a heat treatment according to Example 1.
Figure 5:
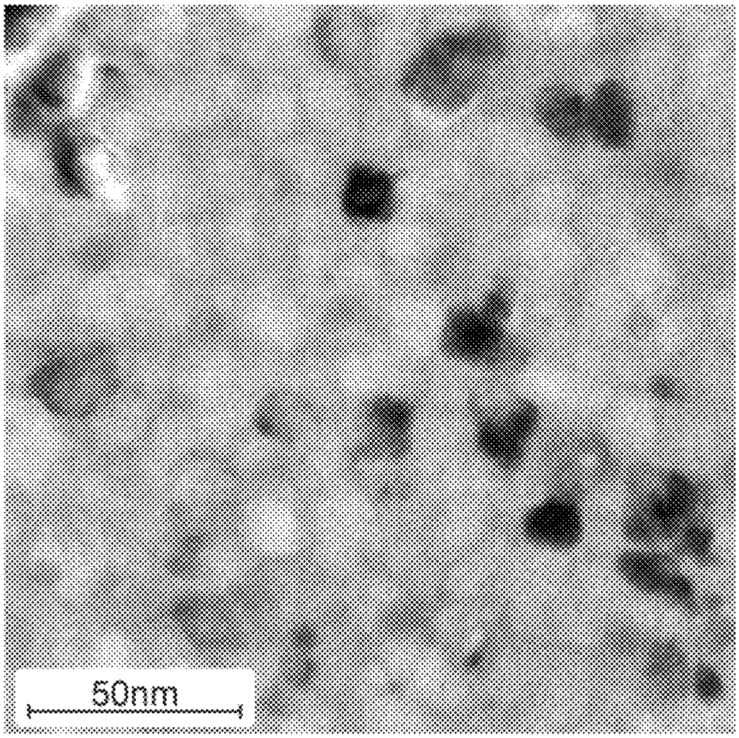
FIG. 5 is an electron micrograph showing a crystal state of one particle of a magnetic powder after the heat treatment.

As shown in FIG. 4, it was found that in the powder before the heat treatment, the inside of the particle became amorphous due to a rapid cooling by the water atomizing method in the powdering step. On the other hand, as shown in FIG. 5, it was found that in the magnetic powder after the heat treatment, innumerable crystals having a size of about several tens of nm were formed inside the particle. From the above, it was shown that in the particle of Example 1, the inside thereof became amorphous in the powdering step and was nanocrystallized by the subsequent heat treatment.

2.3. Evaluation of Coercive Force

The coercive force, which is one of the magnetic properties, was measured for the magnetic powders of Example 2 and Comparative Examples 3 to 6. Specifically, the coercive force was measured using a VSM system TM-VSM1230-MHHL manufactured by TAMAKAWA Co., Ltd. as a magnetization measuring device. Measured values are shown in Table 1. Table 1 shows that the magnetic powder of Example 2 has an improved coercive force compared with the magnetic powder of Comparative Examples 3, 4, and 6.

TABLE 1

| | | Example 2 | Comparative Example 3 | Comparative Example 4 | Comparative Example 5 | Comparative Example 6 |
|---|---|---|---|---|---|---|
| Coercive force [Oe] | | 1.2 | 0.7 | 0.4 | 1.8 | 0.9 |
| Attenuation of magnetic permeability [%] | 100 KHz | 100.0 | | 100.0 | | |
| | 1 MHz | 100.5 | | 99.2 | | |
| | 10 MHz | 98.4 | | 97.6 | | |
| | 100 MHz | 97.3 | | 92.5 | | |

2.4. Evaluation of Magnetic Permeability

The magnetic permeability, which is one of the magnetic properties, was measured for the magnetic powder molded bodies produced from the magnetic powders of Example 2 and Comparative Example 4. Specifically, a ring-shaped magnetic core used for a choke coil, a so-called toroidal core, was produced from each magnetic powder, and the magnetic permeability of the toroidal core was measured.

Specifically, an epoxy-based resin as the binder was added to each magnetic powder such that an addition amount of a solid content was 2.0 wt %. The epoxy-based resin and the magnetic powder were mixed and dried to form a lump. After crushing the lump, coarse particles were removed with a sieve having a mesh size of 600 μm to obtain a granulated powder. Then, the granulated powder was press-molded at a molding pressure of 294 MPa into a ring shape having an outer diameter of 14 mm, an inner diameter of 8 mm, and a thickness of 3 mm. Next, the press-molded granulated powder was heated at 150° C. for 30 minutes to obtain the toroidal core. Next, a copper wire having a wire diameter of 0.5 mm coated with an insulating resin was wound around the toroidal core with a winding number of 7 to form a toroidal coil.

The magnetic permeabilities at frequencies of 100 kHz, 1 MHz, 10 MHz and 100 MHz were measured for each toroidal coil using a 4294A Precision Impedance Analyzer manufactured by Agilent. Based on the measured magnetic permeability, an attenuation of the magnetic permeability at each frequency of 1 MHz or higher when the magnetic permeability at the frequency of 100 kHz is 100% for each of Example 2 and Comparative Example 4 was calculated and the results were recorded in Table 1. The magnetic permeability at the frequency of 100 kHz was 18.2 in Example 2 and 25.5 in Comparative Example 4. From Table 1, it was found that the magnetic permeability of the toroidal coil of Example 2 was unlikely to be attenuated even on a high frequency side.

2.5. Evaluation of High Frequency Characteristics

The high frequency characteristics of the magnetic powder molded bodies produced from the magnetic powders of Examples 2 and 3 and Comparative Examples 1 and 2 were investigated. Specifically, first, toroidal cores were produced respectively in the same manner as in Example 2. Then, a resin-coated copper wire having a wire diameter of 0.5 mm was wound on both a primary side and a secondary side with a winding number of 36 to form the toroidal coil.

Figure 6:
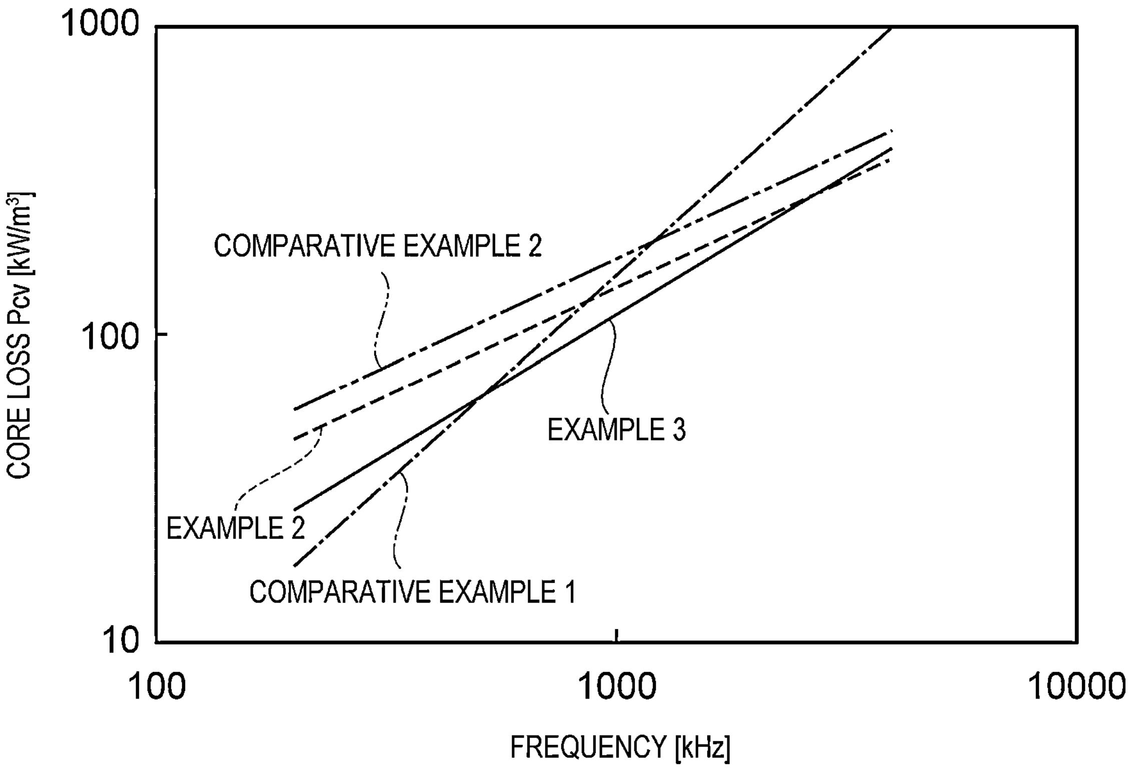
FIG. 6 is a graph showing frequency characteristics of core loss in toroidal coils of Examples and Comparative Examples.

For each toroidal coil, a core loss, i.e., an iron loss, was measured every 100 kHz from a frequency of 500 kHz to 1000 kHz at a maximum magnetic flux density of 10 mT using a B—H analyzer SY8258 manufactured by Iwatsu Electric Co., Ltd. Measurement results are shown in FIG. 6. In FIG. 6, a horizontal axis represents the frequency (kHz) and a vertical axis represents the core loss Pcv (kW/m$^3$). In addition, for each level, approximate straight lines obtained from six measured values are extended to the high frequency side of 1000 kHz or higher and recorded.

As shown in FIG. 6, the toroidal coils of Examples 2 and 3 have a reduced core loss at approximately 500 kHz or higher as compared with the toroidal coil of Comparative Example 2. Further, the toroidal coils of Examples 2 and 3 have a reduced core loss on a high frequency side in a range of approximately 700 kHz to 1000 kHz as compared with the toroidal coil of Comparative Example 1. In particular, the approximate straight line of the toroidal coil of Comparative Example 1 has a larger inclination than that of others, and the core loss worsens toward the high frequency side.

What is claimed is:

1. A magnetic powder powdered by a water atomizing method, comprising:

a soft magnetic material represented by the following composition formula, wherein;

$Fe_aCu_bNb_cSi_dB_e$ where a, b, c, d, and e each indicates an atomic percentage, 71.0 at %≤a≤76.0 at %, 0.5 at %≤b≤1.5 at %, 2.0 at %≤c≤4.0 at %, 11.0 at %≤d≤16.0 at %, and 8.0 at %≤e≤13.0 at %, wherein the soft magnetic material is contained in an amount of 80 wt % or more based on a total mass of the magnetic powder, an average particle size is 2 μm or more and 3.3 μm or less, at least a surface layer of the magnetic powder is nanocrystallized, and a specific resistance of the magnetic powder is 10 MΩ·cm or more and 500 GΩ·cm or less, wherein the specific resistance is measured by filling an alumina cylinder with 1 g of the magnetic powder, placing brass electrodes at each end of the alumina cylinder, and while pressurizing the brass electrodes at each end of the alumina cylinder with a load of 20 kgf using a digital force gauge, an electrical resistance between the brass electrodes at each end of the alumina cylinder is measured using a digital multimeter and a distance between the brass electrodes at each end of the alumina cylinder is also measured, and after measuring the electrical resistance between the brass electrodes and measuring the distance between the brass electrodes, the measured electrical resistance and the measured distance are input into the following formula (2) to determine the specific resistance:

specific resistance [MΩ·cm]=the measured electrical resistance [MΩ]×a cross-sectional area inside the alumina cylinder [cm$^2$]/the distance between the brass electrodes during pressurization [cm] (2).

2. The magnetic powder according to claim 1, wherein a is 73.5, b is 1.0, c is 3.0, d is 13.5, and e is 9.0.

3. A magnetic powder molded body, comprising:

the magnetic powder according to claim 1.

* * * * *